United States Patent [19]
Briggs

[11] Patent Number: 4,850,395
[45] Date of Patent: Jul. 25, 1989

[54] HIGH PRESSURE FLEXIBLE PIPE

[75] Inventor: Kerry D. Briggs, South Berwick, Me.

[73] Assignee: Simplex Wire & Cable, Portsmouth, N.H.

[21] Appl. No.: 131,747

[22] Filed: Dec. 11, 1987

[51] Int. Cl.[4] .............................................. F16L 11/12
[52] U.S. Cl. ...................................... 138/30; 138/124; 138/125; 138/127; 138/174
[58] Field of Search ............... 138/103, 118, 119, 123, 138/124, 125, 126, 127, 129, 130, 172, 174, 177, 178

[56] References Cited

U.S. PATENT DOCUMENTS

| Re. 32,508 | 9/1987 | Feucht | 138/127 |
|---|---|---|---|
| 2,470,599 | 5/1949 | Billmeyer | 138/130 |
| 2,742,931 | 4/1956 | De Ganahl | 138/130 |
| 3,212,528 | 10/1965 | Haas | 138/129 |
| 3,866,633 | 2/1975 | Taylor | 138/130 |
| 3,905,398 | 9/1975 | Johansen et al. | 138/125 |
| 4,009,734 | 3/1977 | Sullivan | 138/118 |
| 4,089,190 | 5/1978 | Worgan et al. | 138/130 |
| 4,153,079 | 3/1979 | Ambrose | 138/124 |
| 4,157,101 | 6/1979 | Ross | 138/103 |
| 4,190,086 | 2/1980 | Bormioli | 138/103 |
| 4,343,333 | 8/1982 | Keister | 138/130 |
| 4,384,595 | 5/1983 | Washkewicz et al. | 138/127 |

FOREIGN PATENT DOCUMENTS 833492 7/1938 France ............................. 138/130

Primary Examiner—James E. Bryant, III
Attorney, Agent, or Firm—Austin R. Miller

[57] ABSTRACT

A flexible composite pipe capable of being wound on a reel and quickly deployed at low cost while floating empty and carrying water from one location to another and being rewound after use, the pipe having a minimum burst strength of about 3,000 psi, a minimum tensile strength of about 130,000 lbs. of tension, a specific gravity less than that of water when full of air and a specific gravity greater than one full of liquid, the pipe including a flexible core tube of thermoplastic material having a compressive strength of less than about 4,000 psi, an inner aramid fiber layer radially disposed about the core tube providing radial strength to the pipe, an inner tape layer radially disposed about the inner aramid fiber layer, an outer aramid fiber layer radially disposed about the inner tape layer to provide further radial strength to the pipe, an outer tape layer radially disposed about the aramid fiber layer, an inner steel armor wire layer helically wound about the outer tape layer providing radial strength, longitudinal strength, cut resistance and twist resistance, an outer steel armor wire layer oppositely and helically wound about the inner steel wire layer and a flexible pipe jacket of scuff resistance plastic polymer material.

17 Claims, 2 Drawing Sheets

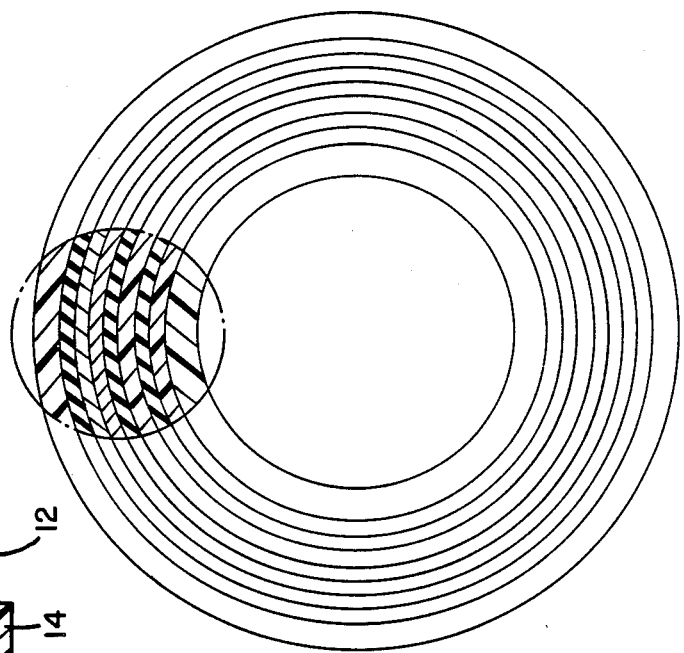
FIG. 2
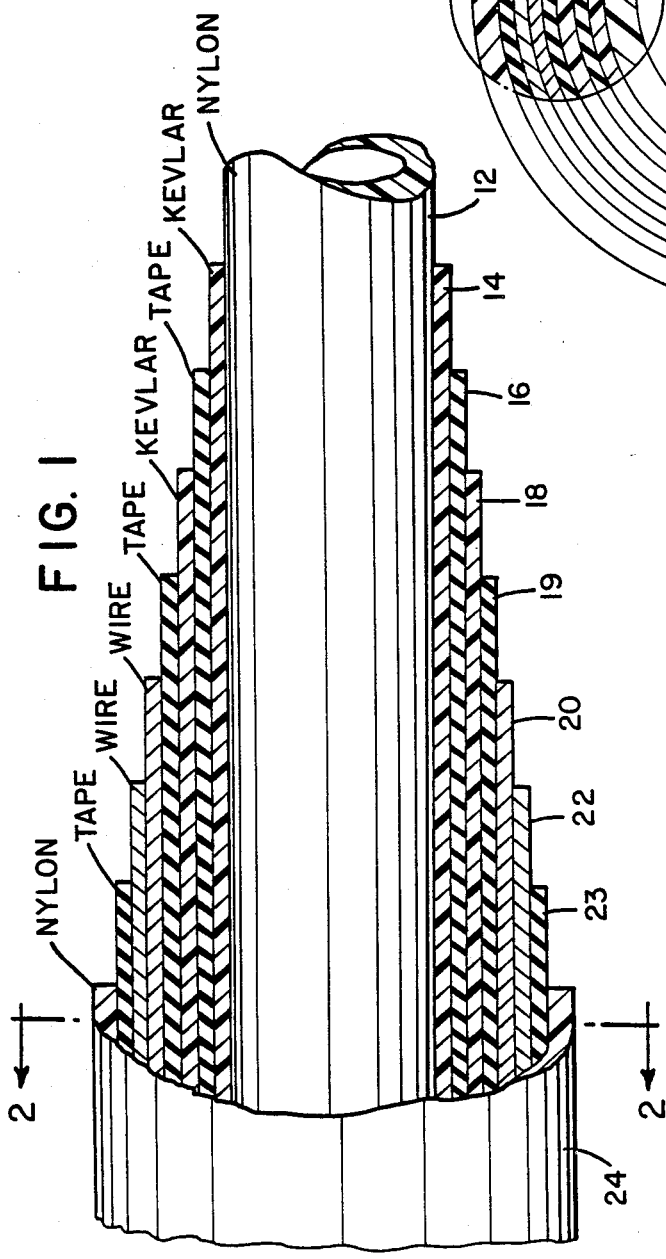
FIG. 1
FIG. 3

HIGH PRESSURE FLEXIBLE PIPE

FIELD OF THE INVENTION

This invention relates to flexible composite pipe which is capable of being repeatedly wound and unwound on a reel for deployment in water, having a high tensile strength and a high burst strength.

There are a great many different situations when it is desirable or necessary to transfer vast quantities of liquids over a body of water for long distances by pipe. Hereinafter, the term "water" includes fresh or salt water or the like. Typically, this occurs when a boat or ship has a cargo of potable water or any variety of fuels to be delivered either to a land mass or to another ship. In many instances, the delivering ship is unable to closely approach the land mass or dock at a pier facility. Sometimes there are no suitable facilities available or there are water perils such as obstacles or insufficient water depth. Of particular interest are amphibious landings under combat conditions where it would often be perilous or possibly lethal for a ship to closely approach the landing zone.

As a consequence of this frequent inability to approach the shoreline, it is possible for the ship to stand offshore and transfer the liquid cargo to shore using other small craft, to unload by hand with five gallon cans as has been the practice in the past, or to transfer directly by pipe. The first alternative is undesirable for several reasons. Often there are no smaller crafts available or too few. The unloading time will be delayed and delivery sporadic. Also, small crafts are vulnerable to hostile fire, as are larger craft. The second alternative is undesirable because of the inefficient use of frequently scarce manpower.

A more favorable approach is to transfer by pipe. Until now, there have been many shortcomings associated with transfer by pipe. Quite frequently the distances involved can extend up to four or five miles or more. In order to pump liquids through pipe ranging from 2 to 12 inches in diameter over such a large distance, large pressure drops are encountered, and very high pressures are needed at the starting point. Typically, pressure would be in the range of 600 to 1000 psi or more. Over the course of the length of pipe, the pressure drops dramatically. Therefore, any pipe design should be capable of withstanding burst pressures in the order of 3000 to 4000 psi or more when allowing for adequate safety margins.

With the great length involved, any pipe should be able to withstand great tensile loads as well. Because the pipe is typically deployed in a harsh and turbulent water environment, the pipe is subjected to a variety of different longitudinal pulling stresses initiating from such deployment and wave and current action. Also, the pipe must be flexible in order to be wound prior to deployment.

Transporting and installing great lengths of rigid steel pipe is often impractical, costly, and highly time consuming. Deploying such rigid pipe requires a multitude of welds since lengths of rigid pipe are typically only about 200 to 300 feet in length. This procedure is untenable over a four to five mile expanse since it requires a large quantity of manpower, equipment and time, and is highly susceptible to leaking from the welds.

DESCRIPTION OF THE PRIOR ART

U.S. Pat. No. 4,000,759 is a buoyant flexible pipe. It achieves its floating capabilities by helically winding a plurality of elastomeric or plastic type material tubing around a pipe liner. In toto, the component layers have a sufficiently low specific gravity to effect buoyancy. The tubular windings also act as reinforcement so that the pipe may be subjected to pressure loads, but they provide no reinforcement for longitudinal tensions. One disadvantage of this pipe for long length applications is that it is designed to continually float. It will float even when filled with liquid, which leaves it vulnerable to surface perils such as shipping traffic and to wave and current tensions which can move a moored tanker. Another disadvantage of this pipe is that the ends have increased diameters needed to seal the tubular windings. The bulbous ends make winding on a reel quite 1.

U.S. Pat. No. 4,153,079 a non-floating flexible hose for loading and unloading oil tankers. The hose is supplied with a fluid retaining carcass to absorb any leakage if the main pipe fails. The hose is also reinforced to withstand the application of pressure. The primary disadvantage of this hose is that it will not float upon deployment. It requires the use of separate buoyant floats which would later have to be removed and a separate laying vessel which should be able to closely approach the shoreline. Furthermore, it also has bulbous ends which make winding on a reel impractical. This hose provides means for radial expansion to retain fluids. Any expansion would further preclude winding. Such a hose is typically constructed on a mandrel, with the maximum length of hose equaling the length of the mandrel, which is only about 200 to 300 feet.

U.S. Pat. No. 4,377,186 discloses a floating flexible conduit. Buoyancy is effected by the use of materials having a density less than one. Resistance to radial pressure and crushing is addressed by forming a spirally wound stratum of thermoplastic interlocked in S-form. The primary disadvantage of this conduit is that it too is buoyant continually, even during use. Another disadvantage is that no tension protection is provided, and the load protection is typically limited to only several hundred psi.

U.S. Pat. No. 4,384,595 discloses a flexible hose concentrating primarily on its ability to withstand high pressure, maintain flexibility and resist kinking. To achieve these properties, steel reinforcing wire is used in combination with aramid yarns. A plurality of layers of aramid yarns are wound about a tube, then the steel wires are wound about the aramid yarn. One disadvantage of this hose is that no mention is made of any ability to float during deployment and sink during use. Another disadvantage is that the core tends to collapse when under high longitudinal pulling tension. Furthermore, no protection is provided to prevent the self-abrasion of the aramid fibers or abrasion between the aramid fibers and the armor wires.

OBJECTS OF THE INVENTION

Thus, it is an object of the present invention to provide a flexible pipe that is capable of being repeatedly wound and unwound on a reel to be deployed off of a ship, but still having a high burst strength capable of withstanding high internal pressures generated by pumping liquids over great distances within the pipe, while also having a high tensile strength capable of withstanding extreme tensile loads placed upon the pipe by deploying lengthy sections in water.

It is a further important object of the present invention to provide a pipe having high scuff or abrasion resistance and high cut and twisting resistance which is necessary when long sections are deployed from a ship into a marine environment and then retrieved.

It is another important object of the present invention to provide a pipe that floats when empty during deployment in the water and then sinks when the liquid desired to be transferred is pumped therethrough, and capable of manufacture and deployment in sections of considerable length, such as at least one-half mile, for example.

It is still another important object of the present invention to provide a pipe which can easily be transported over land to a ship by a flatbed trailer and which can be easily repaired in the field without having specialized equipment such as vulcanizing apparatus.

Other objects and advantages of the present invention will further become apparent to those skilled in the art from the drawings, the detailed description of preferred embodiments and the appended claims.

SUMMARY OF THE INVENTION

The present invention provides for the first time a pipe that is flexible enough to be wound upon and quickly unwound from a reel, easily made up in sections of considerable length readily connected to and disconnected from each other, light enough to float when deployed in water and sink when filled with a desired fluid, having a high burst strength and a high tensile strength for resisting high internal pressures and high tensile loads while having outer protection against cuts and abrasion. A flexible core tube is provided with an outboard layer of aramid fiber followed by a layer of tape. Surrounding the tape is a second layer of aramid fiber followed by a second tape layer. An armor wire layer surrounds the second tape layer and is itself surrounded by a second armor wire layer. The second armor wire layer is covered with a third tape layer which is in turn covered by a final outermost flexible pipe jacket.

BRIEF DESCRIPTION OF THE DRAWINGS

FIG. 1 is a side view, partly broken away in successive layers, of one embodiment of a pipe in accordance with the present invention.

FIG. 2 is a cross-sectional view taken along the lines 2—2 of FIG. 1.

FIG. 3 is an exploded cross-sectional view of the area encompassed within the shadow line of FIG. 2.

Figure 5:
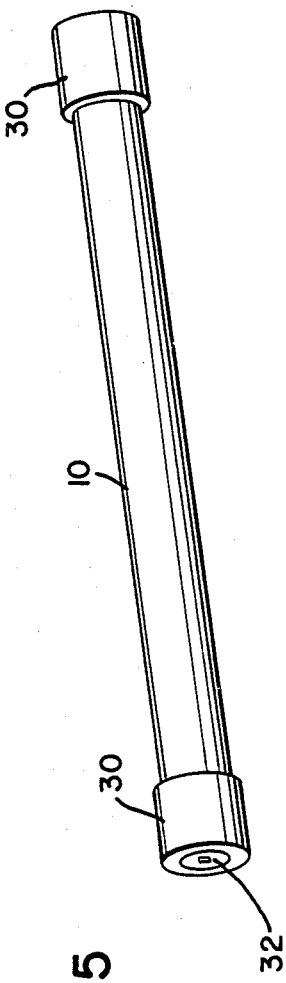
FIG. 5 is a perspective view of a pipe section of the invention having air tight sealable coupling means on each end.

DESCRIPTION OF PREFERRED EMBODIMENTS OF THE INVENTION AND THE BEST MADE CONTEMPLATED FOR PRACTICE THEREOF

FIG. 1 shows pipe 10 with core tube 12 as the innermost composite layer. Core tube 12 is surrounded by aramid fiber layer 14 which is covered by inner tape layer 16. Outer aramid fiber layer 18 surrounds inner tape layer 15 and 16 itself covered by middle tape layer 19. Outboard of middle tape layer 19 is inner wire layer 20. Outer wire layer 22 surrounds inner wire layer 20 and is inboard of outer tape layer 23. Jacket 24 is the outermost layer.

FIG. 2 shows an end view of the individual layers that make up composite pipe 10. The innermost layer is core tube 12 which is covered by inner aramid fiber layer 14. Inner tape layer 16 surrounds aramid fiber layer 14 and is itself surrounded by another outer aramid fiber layer 18. Exterior of aramid fiber layer 18 is middle tape layer 19. Surrounding middle tape layer 19 is inner armor wire layer 20 which is followed by a second outer wire layer 22. Pipe jacket 24 surrounds is the outer tape layer 23 is the outermost and final layer.

FIG. 3 shows more clearly each layer of pipe 10. Because of the importance of having a flexible pipe, core tube 12 should be selected from materials that are flexible. Core tube 12 should also possess a burst strength of up to about 300 psi or more, and a compressive strength of about 6,000 psi or more, as well as appreciable tensile strength and crush resistance. High compressive strength for the core tube 12 is critical because internal pressures exerted radially outward by the load carried therewithin tends to cause cold flow, or the low temperature outward extrusion of core tube 12 through the surrounding layers. Since pipe 10 may be handled aboard a ship and deployed in water it will be subjected to burst pressures from within, tensile load during deployment and various crushing forces. Furthermore, since an important feature of the pipe is its ability to float prior to pumping any liquids into it, the materials for core tube 12 are appropriately light in weight. Suitable materials that meet these requirements include blocked thermoplastic polymers or elastomers such as Hytrel ® (as manufactured by E.I. duPont de Nemours Company), various nylons, thermoplastic rubbers, polyethylene or polyurethane. The preferred material is a nylon.

Figure 4:
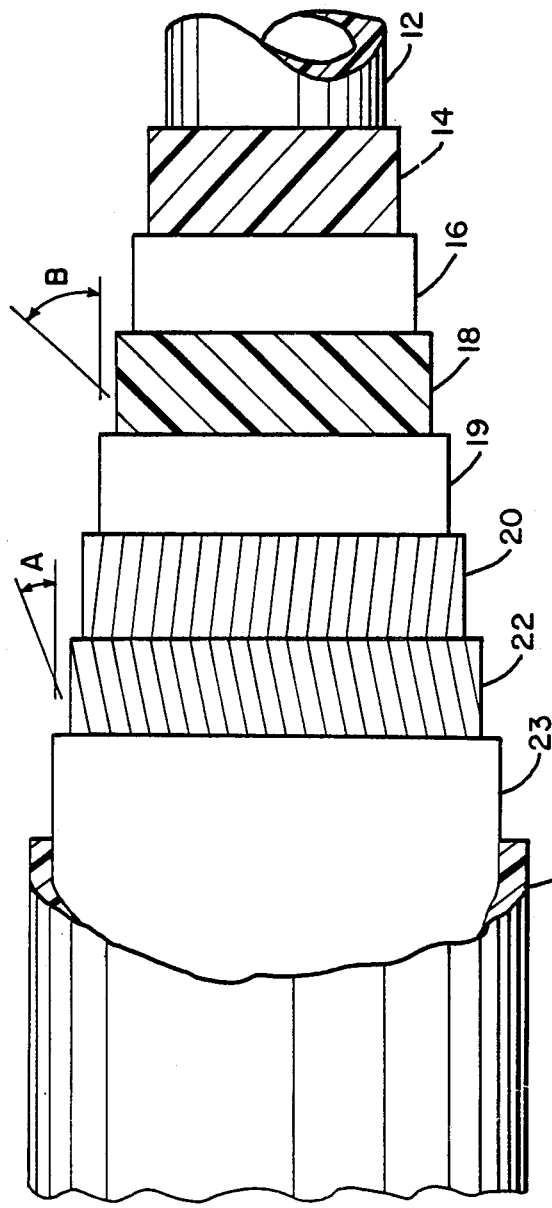
FIG. 4 is a side view of the pipe of FIG. 1, the layers being broken away progressively to illustrate the nature thereof.

FIG. 4 shows pipe 10 having its layers progressively broken away to illustrate the direction of application of the respective outer wire layer 22, inner wire layer 20, outer aramid fiber layer 18 and inner aramid fiber layer 14. The respective aramid fiber and wire layers are helically wound about their adjacent inboard layer. Outer wire layer and inner wire layer 20 are wound in opposite directions as shown in FIG. 4 by the angled lines and outer aramid fiber wire 18 is wound oppositely to inner aramid fiber layer 14 as also shown in FIG. 4. Tape layers 16, 19 and 23 do not have a preferred angle of winding and, accordingly, are shown as blank layers in FIG. 4.

FIG. 5 shows a preferred pipe section of pipe 10 manufactured in accordance with the invention. The pipe shown in FIG. 5 is capable of winding on a reel and further capable of connection to other pipe sections by way of couplings 30. Couplings 30 are capable of receiving end caps 32 to provide an air-water tight seal for coupling 30. By sealing both couplings 30 with end caps 32, sections of pipe 10 can be unwound from a reel or reels and will float until it is desired to connect them together to form a larger pipe section.

Core tube 12 as used in the above situations is about ½ inch thick for a 6 inch pipe. However, as particular operating requirements change, so too can the thickness of core tube 12. For example, a 4 inch pipe might utilize a ⅜ inch thick pipe, while an 8 inch might utilize a ⅝ to ¾ inch thick pipe.

Core tube 12 is surrounded by aramid fiber layer 14 which is utilized as a very light weight reinforcement material designed to handle the radial load exerted on pipe 10 by high internal pumping pressure. In order that the radial load not be transferred to outer armor wire layers 20 and 22, aramid fiber layer 14 should possess a high modulus of elasticity. For example, a modulus of elasticity of about 18 million is preferred. Since aramid fiber layer 14 is wound about core tube 12 to handle radial pressure, it possesses remarkably high tensile strength.

The material best suited to meet these requirements is an aromatic polyamide fiber such as Kevlar ® (as manufactured by E.I. duPont de Nemours Company). Kevlar possesses both a high tensile strength and a high modulus of elasticity and is very light in weight. In this particular embodiment, 2,100 Kevlar filaments are wound into a strand. Five strands are then twisted together to form a roving. Sixty rovings are helically wound about core tube 12 to form aramid fiber layer 14 which in the preferred embodiment is about ⅛ inch thick.

The preferred angle of application of the Kevlar rovings is about 79° with the preferred range of application being from about 75° to about 85°, as generally depicted by angle B in FIG. 4. It is preferred to have about 100% coverage of the Kevlar over the adjacent inboard layer.

Inner tape layer 16 completely surrounds aramid fiber layer 14 and creates a bed for outer aramid fiber layer 18. We have found that aramid fibers have poor abrasion resistance relative to each other. This is a serious problem since pipe 10 is flexible. The interior layers shift position relative to each other when pipe 10 is bent. This shifting of positions causes inner aramid fiber layer 14 to rub against outer aramid fiber layer 18 which causes a substantial amount of friction. Friction results in chafing, which over a period of time weakens and eventually destroys the aramid fiber layers.

Because of this, inner tape layer 16 has been interposed between the two aramid fibers layers. Inner tape layer 16 allows the two aramid fiber layers to shift positions relative to each other without causing excessive friction or the resulting chafing. Thus, the troublesome self-abrasion problem is solved. One suitable material for a tape layer is a thin nylon fabric coated with urethane. Tape layers are typically helically wound over other layers.

Outer aramid fiber layer 18 is helically wound about inner layer 16 and completely surrounds it. This layer provides reinforcement along with inner aramid fiber layer 14 against radial load. Typically, outer aramid fiber layer 18 is helically wound in a direction opposite to that of inner aramid fiber layer 14, primarily for torque balancing.

Middle tape layer 19 completely surrounds outer aramid fiber layer 18 and creates a bed for inner armor wire layer 20. In addition to the self-abrasion problem presented by two aramid fibers layers being placed adjacent to one another, we have found that there is also a problem with an aramid fiber layer being placed against an armor wire layer. Each helically wound wire acts independently of one another during flexing and moves at different rates and amounts.

The armor wire layer windings present high edges to lie against the aramid fiber layer, and the independent moving action abrades the aramid fibers away. Middle tape layer 19 is inserted to prevent this. We have also discovered the surprising fact that a tape of layer is not needed to protect aramid fibers from all types of layers. No tape layer is placed between pipe core 16 and inner aramid fiber layer 18. We found that when properly extruded, thermoplastic pipe core 16 has smooth surfaces and acts as a single unit with no edges, so that the aramid fiber layer and the pipe core form a non-abrasive interface. Thus, there is no abrasion and no need for a protective tape layer.

Inner armor wire layer 20 is helically wound about middle tape layer 19 primarily to provide longitudinal or axial strength to pipe 10 against severe tension loads. To provide this protection, the armor wire must have a high tensile strength and preferably a low lay angle. For example, it is preferred to have a lay angle of about 16°. The preferred range of lay angles is about 14° to 20°, as generally depicted by angle A in FIG. 4. The wire layers should preferably have nearly completely coverage of about 97% to 98%.

Steel is the preferred material for the armor wire because of its very high tensile strength. Steel also imparts other advantages. Because the environment pipe 10 is exposed to can be harsh, there is a need to protect against cuts. Steel wire is highly resistant to cutting especially when compared to other typical pipe layer components such as rubber, plastics or yarn. Also, steel wire is quite resistant to twisting, which occurs when the pipe is being wound or is floating on the surface or is in service under water. While it is possible to utilize a wide variety of steels, it is preferred to use galvanized steel to resist corrosion in the event that pipe jacket 24 is in any way broached in a particular spot. A galvanized steel having a tensile strength of about 100,000 to 120,000 psi and being about 80 mils thick by 550 mils wide is most preferred.

Steel is the preferred material for the armor wire for the further reason that it provides the pipe with the proper weight when full of fluid. All of the other pipe 10 constituents are comparatively light so as to effect buoyancy to pipe 10. However, when in use, pipe 10 is to operate under water; the addition of the weight of the fluid to be transported making pipe 10 sink. Therefore, the specific gravity of pipe 10, in toto, must be sufficiently close to 1.0 when empty to allow pipe 10 to barely float, then to sink when fluids are pumped therethrough. With pipe 10 barely floating when empty it becomes comparatively very heavy when full and achieves maximum bottom stability to avoid the influence of underwater currents. The armor wire layers allow for this increased bottom stability.

Outer armor wire layer 22 is helically wound about inner armor wire layer 20 to provide further strength to pipe 10. In the preferred embodiment, outer armor wire layer 22 is wound in a direction opposite to that of inner armor wire layer 20 to insure torque balancing of the pipe.

In the preferred embodiment, pipe 10 is provided with outer tape layer 23 primarily to facilitate the manufacturing process. The tape provides a barrier against "out gassing" from boiling residual oils on the armor wire layers when they are surrounded by the extruded hot pipe jacket 24. Also, outer tape layer 23 helps to prevent portions of the pipe jacket 24 from being extruded into any spaces between wires in the armor layers.

Pipe jacket 24 surrounds outer armor wire layer 22 and outer tape layer 23 to provide a final layer of protection for the inwardly disposed layers. Like core tube 12, pipe jacket 24 must be flexible, but since strength is not its primary objective, it need not be as thick. It provides protection for armor wire layers 20 and 22 from exposure to moisture and makes the pipe easier to handle. It keeps the armor wires and aramid fibers snugly in their desired positions. It should also be resistant to ultraviolet light so as to protect against harsh sunlight. Furthermore, pipe jacket 24 provides resistance to cutting, scuffing and abrasion. The preferred material is similar to that of core tube 12, namely the blocked thermoplastic polymers or elastomers such as Hytrel®, nylon, polyethylene or polyurethane. It is also desirable that the selected material not require any vulcanizing treatment to effect repairs to the jacket in the instance when repair is desired.

Although this invention has been described in connection with specific forms therefor, it will be appreciated that a wide array of equivalents may be substituted for those specific elements shown and described herein without departing from the spirit and scope of this invention as described in the appended claims.

I claim:

1. A flexible composite pipe capable of being wound on a reel and quickly deployed at low cost while floating empty then carrying a fluid under water from one location to another and then being rewound after use, said pipe having a minimum burst strength of about 3,000 psi, a minimum tensile strength of about 130,000 lb. tension, a specific gravity less than that of water when full of air and a specific gravity greater than that of water when full of liquid, which comprises:
   a flexible core tube of thermoplastic polymeric material having a compressive strength less than about 4,000 psi and having flexibility to be capable of being repeatedly wound and unwound on a reel;
   an inner aramid fiber layer radially disposed about said core tube providing radial strength to said pipe;
   an inner tape layer radially disposed about said inner aramid fiber layer;
   an outer aramid fiber layer radially disposed about said inner tape layer to provide further radial strength to said pipe, said inner tape layer forming a bed for said outer aramid fiber layer and protection for said outer aramid fiber layer and protection for said inner aramid fiber layer, such that said aramid fiber layers do not chafe and abrade each other;
   an outer tape layer radially disposed about said outer aramid fiber layer;
   an inner steel armor wire layer helically wound about said outer tape layer providing radial strength, longitudinal strength, cut resistance and twist resistance to said pipe, said outer tape layer protecting said outer aramid fiber layer and forming a bed for said inner steel armor wire layer such that said outer aramid fiber layer and said inner armor wire layer do not chafe and abrade each other, said inner and outer tape layers allowing said aramid layers and said wire layer to shift position relative to each other;
   an outer steel armor wire layer oppositely and helically wound about said inner steel armor wire layer in furtherance of said strengths and resistances; and
   a flexible pipe jacket of scuff resistant thermoplastic polymeric material having flexibility capable of being wound and unwound on a reel.

2. A pipe as defined in claim 1 wherein said pipe is constructed in separate lengths and has coupling means mounted on each end thereof capable of withstanding burst pressures of at least 3,000 psi and tension of 130,000 lbs while providing a leak proof seal.

3. A pipe as defined in claim 2 wherein said coupling means are provided with removable air tight sealing means prior to coupling said pipe lengths such that when said pipe lengths are placed in water said pipe lengths will float.

4. A pipe as defined in claim 1 wherein said inner and outer aramid fiber layers are wound in opposite directions.

5. A pipe as defined in claim 1 wherein said pipe jacket cures without vulcanizing treatment.

6. A pipe as defined in claim 1 wherein said inner aramid fiber layer is applied at an angle between about 75° and 85° relative to a central axis extending along said core tube.

7. A pipe as defined in claim 1 wherein said outer aramid fiber layer is applied at an angle between about 75° and 85° relative to a central axis extending along said core tube.

8. A pipe as defined in claim 1 wherein said inner steel armor wire layer is applied at an angle between about 14° and 20° relative to a central axis extending along said core tube.

9. A pipe as defined in claim 1 wherein said outer steel armor wire layer is applied at an angle between about 14° to 20° relative to a central axis extending along said core tube.

10. A pipe as defined in claim 1 wherein said inner and outer steel armor wire layers are wound in opposite directions.

11. A pipe as defined in claim 1 wherein said aramid fiber layers completely cover their respective adjacent inboard layers.

12. A pipe as defined in claim 1 wherein said wire layers cover between 97 and 98% of their perspective inboard adjacent layers.

13. A pipe as defined in claim 1 wherein said wire layers are galvanized steel having a tensile strength of about 100,000 to 120,000 psi.

14. A flexible composite pipe capable of being wound on a reel and quickly deployed at low cost while floating empty then carrying a fluid under water from one location to another and then being rewound after use, said pipe having a minimum burst strength of about 3,000 psi, a minimum tensile strength of about 130,000 lb tension, a specific gravity less than that of water when full of air and a specific gravity greater than that of water when full of liquid, which comprises:
   a flexible core tube of thermoplastic polymeric material having a compressive strength less than about 4,000 psi and having flexibility to be capable of being repeatedly wound and unwound on a reel;
   an inner aramid fiber layer radially disposed about said core tube providing radial strength to said pipe;
   an inner tape layer radially disposed about said inner aramid fiber layer;
   an outer aramid fiber layer radially disposed about said inner tape layer to provide further radial strength to said pipe, said inner tape layer forming a bed for said outer aramid fiber layer and protection for said inner aramid fiber layer, such that said aramid fiber layers do not chafe and abrade each other;
   a middle tape layer radially disposed about said outer aramid fiber layer;

an inner steel armor wire layer helically wound about said outer aramid fiber layer providing radial strength, longitudinal strength, cut resistance and twist resistance to said pipe, said middle tape layer forming protection for said outer aramid fiber layer and a bed for said inner steel armor wire layer such that said outer aramid fiber layer and said inner armor wire layer do not chafe and abrade each other, said inner and outer tape layers allowing said aramid layers and said wire layer to shift positions relative to each other;

an outer steel armor wire layer oppositely and helically wound about said inner steel armor wire layer in furtherance of said strengths and resistances;

an outer tape layer radially disposed about said outer steel armor wire layer; and a flexible pipe jacket of scuff resistant thermoplastic polymeric material having flexibility capable of being wound and unwound on a reel, said outer tape layer preventing portions of said pipe jacket from extruding into said steel armor wire layers.

15. A flexible composite pipe capable of being wound on a reel and quickly deployed at low cost while floating empty then carrying a load under water from one location to another and then being rewound after use, said pipe having a minimum burst strength of 3,000 psi, a minimum tensile strength of 130,000 lbs. of tension, and overall specific gravity of about 1.0, which comprises:

a flexible core tube of thermoplastic polymeric material having a compressive strength less than about 4,000 psi and having flexibility of being capable of being repeatedly wound and unwound on a reel;

an inner aramid fiber layer radially disposed about said core tube at an angle of between 75° and 85° relative to a central axis extending along said core tube to provide radial strength to said pipe;

an inner tape layer radially disposed about said inner aramid fiber layer;

an outer aramid fiber layer readily disposed about said inner tape layer at an angle between about 75° and 85° relative to said central axis to provide further radial strength to said pipe, said inner tape layer forming a bed for said outer aramid fiber layer and for said inner aramid fiber layer such that said inner and outer aramid fiber layers do not chafe and abrade each other upon relative shifting movement;

an outer tape layer radially disposed of about said outer aramid fiber layer;

an inner steel armor wire layer helically wound about said outer tape layer at an angle between about 14° and 20° relative to said central axis to provide radial strength, longitudinal strength, cut resistance and twist resistance to said pipe, said outer tape layer protecting said outer aramid fiber layer and changing a bed for said inner steel armor wire layer such that said aramid fiber layer and said inner armor wire layer do not chafe and abrade each other upon relative shifting movement, said inner and outer tape layers allowing said aramid layers and said wire layer to shift positions relative to each other, an outer steel armor wire layer oppositely and helically wound about aid inner steel armor wire layer at an angle between about 14° and 20° relative to said axis in furtherance of said strengths and resistances;

a flexible pipe jacket of scuff resistant plastic polymeric material having flexibility capable of being wound and unwound on a reel.

16. A pipe as defined in claim 15 further comprising a middle tape layer radially disposed about said outer aramid fiber layer.

17. A pipe as defined in claim 15 wherein said aramid fiber layers have a modulus of elasticity of about 18 million.

* * * * *